June 22, 1965 W. J. MAHONEY 3,191,060

PULSE GENERATING CIRCUITS

Filed April 23, 1962

INVENTOR

WILLIAM J. MAHONEY

BY Stewart F. Moore

ATTORNEY

United States Patent Office
3,191,060
Patented June 22, 1965

3,191,060
PULSE GENERATING CIRCUITS

William J. Mahoney, Darien, Conn., assignor to American Machine & Foundry Company, a corporation of New Jersey Filed Apr. 23, 1962, Ser. No. 189,592
16 Claims. (Cl. 307—88.5)

Figure 1:
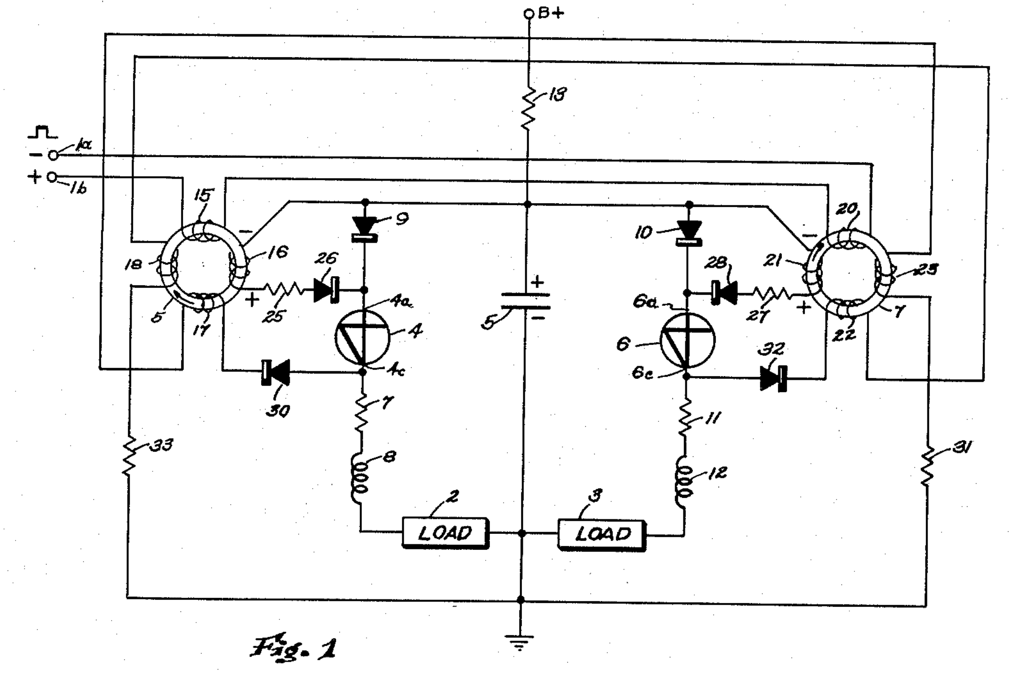

This invention relates to pulse generating circuits, and more particularly to such circuits utilizing regenerative semiconductors in combination with saturable magnetic cores.

Pulse distributors are used extensively in electronic computers to provide output pulses on a number of separate output lines sequentially, the output pulses being in response to successive input pulses. For example, pulse distributors are used to drive many shift registers and core matrices which operate on the so-called "two clock system" where the successive clock or advancing pulses must be applied alternately to two separate input lines. The pulse distributor required in this instance would be of the binary type, i.e., a two-stage pulse distributor. Since the output pulses developed by the pulse distributor are generally used to drive other circuits, the output pulses must have an appreciable power content. Accordingly, it becomes advantageous to construct a pulse distributor by interconnecting a plurality of pulse generators, i.e., one pulse generator per output line, such that they operate sequentially in response to successive input pulses. While not being limited to any particular application, pulse generators in accordance with this invention are well adapted for such use in pulse distributors.

It is necessary for a pulse distributor to have a memory so as to remember which output line received the previous output pulse. High remnant magnetic cores are ideal for this memory function since they do not lose memory during power shutdown, and since they can be combined as part of the pulse generating circuit. In the past, such pulse generators have often combined a magnetic core with a transistor or vacuum tube amplifying device connected to form a regenerative circuit through the magnetic core. In such circuits a change of flux induced in the core by an applied input pulse generates an output potential which renders the amplifying device conductive. The amplifying device thereafter is maintained conductive since the device applies energy to the core which is regenerated through the core. This regenerative state persists until the core is fully saturated and unable to provide any further output potential. An output pulse is developed via a separate output winding on the core. When such a pulse generator is used in a pulse distributor, each conducting amplifying device operates through a winding on another core to condition that core for response to the next pulse at the same time that the output pulse is developed via the core associated with the amplifying device.

Such past pulse generators have the disadvantage of requiring a relatively large magnetic core whenever an appreciable output pulse is required since the output pulse passes through the magnetic core. Also, these past circuits depend upon regeneration through the magnetic core and therefore the characteristics of the output pulses are determined by the core geometry which is often difficult to control precisely.

It is therefore a general object of this invention to provide a pulse generator using a regenerative semiconductor in combination with a magnetic core to overcome disadvantages experienced with prior pulse generators.

It is another object of this invention to provide a pulse generator which is adaptable for use in pulse distributors.

Still another object is to provide a magnetic core pulse generator for developing an output pulse where the maximum magnitude of the output pulse is independent of the core size.

Still another object is to provide a magnetic core pulse generator for developing an output pulse where the shape and time duration of the output pulse is independent of core geometry.

Another object is in providing a semiconductor magnetic core pulse generator of the regenerative type where the regeneration is in the semiconductor instead of the magnetic core.

Figure 2:
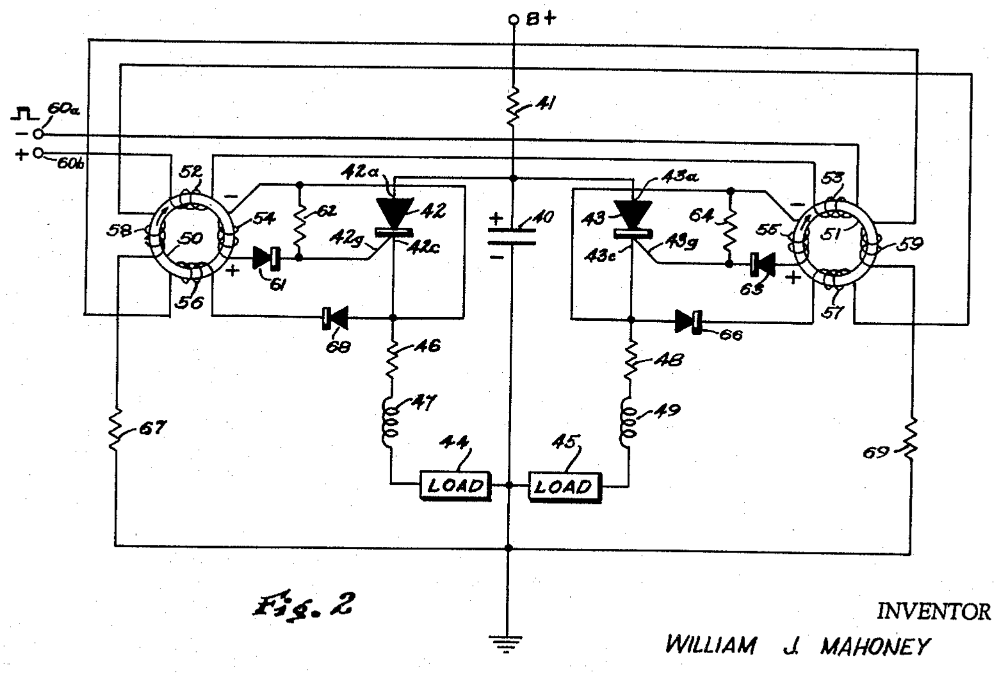

In order that the manner in which these and other objects are attained in accordance with the invention can be understood in detail, reference is had to the accompanying drawings, which form a part of this specification, and wherein:

FIG. 1 is a schematic diagram illustrating a two-stage binary pulse distributor in accordance with one embodiment of this invention; and FIG. 2 is a schematic diagram illustrating a two-stage binary pulse distributor in accordance with a second embodiment of this invention.

An essential feature of pulse generators constructed in accordance with this invention is that they utilize semiconductors which are in themselves regenerative. If an input pulse is applied to a magnetic core associated with the semiconductor which tends to change the core from the set to the reset state, an output potential is developed which triggers the regenerative semiconductor into the conductive state. The semiconductor is connected to discharge a capacitor to provide an output pulse and to energize a winding on this associated core to drive the core into the fully reset state. When the capacitor becomes fully discharged, the regenerative semiconductor regains the original nonconductive state.

When such pulse generators are combined to form a pulse distributor, the developed output pulse, which resets the associated core, is also applied to drive the magnetic core of another pulse generator into the set state. Since the regenerative semiconductor is rendered conductive only when the associated magnetic core is driven toward the reset state, it follows that only a pulse generator having a magnetic core in the set state can produce an output. Accordingly, when input pulses are applied to all cores simultaneously, only that core which has previously been placed in the set state can support a change of flux toward the reset state and therefore only this core can trigger its associated regenerative semiconductor into the conductive state to thereby produce an output pulse. Thus, the core provides the necessary memory function for pulse distribution. The output pulse is developed entirely by the regenerative semiconductor and therefore the shape and magnitude of the output pulse is completely independent of core geometry. The magnitude of the output pulse is adjusted by merely selecting a semiconductor having suitable capacity, and the shape and time duration of the output pulse is adjusted by proper selection of the capacitor discharging circuit parameters.

A regenerative semiconductor is a semiconductor device which is normally nonconductive but, once triggered to the conductive state, is maintained conductive by internal regeneration even though the triggering source is removed. Examples of commercially developed regenerative semiconductor devices are the four-layer diode and the controlled rectifier, both of which are PNPN semiconductors. Other examples of regenerative semiconductors are unijunction transistors and tunnel diodes.

When nonconductive, the four-layer diode can be considered as essentially two back biased PN junctions in series, and therefore the structure normally blocks current flow in either direction. However, if a sufficiently high triggering potential is applied between the anode and cathode, an avalanche breakdown occurs within the structure saturating the two center regions with carriers, thereby forward biasing all three junctions to render the structure conductive. This conductive state persists even though the trigger potential is removed, and persists as long as a mimimum holding current passes through the structure.

A controlled rectifier is essentially the same as a four-layer diode and can be triggered into conduction in essentially the same manner. However, the controlled rectifier is provided with a gate lead connected to the center P region of the structure. Thus, when a positive trigger potential is applied to the gate lead, the center P region with the adjacent N regions become conductive like an NPN transistor. The remaining end P region at the anode of the structure forms a forward biased PN junction with the adjacent N region, and the conductive state is initiated permitting saturation of the center regions. The common characteristic of the four-layer diode and the controlled rectifier is that, once the conductive state is initiated, the center sections of the structures saturate, which in effect is internal regeneration causing the conductive state to persist.

In FIG. 1, two pulse generators including four-layer diodes as the regenerative semiconductor are illustrated interconnected to form a two-stage binary type pulse distributor. As positive pulses are applied to input terminals 1, the pulse distributor provides pulse energy to loads 2 and 3 alternately in accordance with the successive input pulses. Four-layer diode 4 and magnetic core 5 are the active elements of the pulse generator providing output pulses to load 2, a four-layer diode 6 and magnetic core 7 are the active elements of the pulse generator providing output pulses to the load 3.

Anode *4a* of four-layer diode 4 is connected to one plate of a capacitor 5 via a diode 9, the cathode of diode 9 being connected to anode *4a*. Cathode *4c* of the four-layer diode is connected to ground via resistor 7, inductor 8 and load 2 connected in series. A positive source of potential is connected to the one plate of capacitor 5 via resistance 13, and the other plate of the capacitor is connected to ground.

When four-layer diode 4 is nonconducting, capacitor 5 charges from the positive source of potential through resistance 13, building up a potential of the polarity as indicated in the drawing. Subsequently, when four-layer diode 4 is rendered conductive, a low impedance discharge path is provided through diode 9, the cathode anode circuit of the four-layer diode, resistor 7, inductance 8 and load 2, thus providing pulse energization to the load. Resistor 7 limits the discharge current flow and, depending upon the resistance of load 2, can in some instances be eliminated.

Inductor 8 forms a series resonant circuit with capacitor 5 and gives the pulse applied to load 2 the shape of a half sinusoid. Inductor 8 would tend to resonate with capacitor 5, but the tendency for reverse current to flow is blocked by four-layer diode 4 and diode 9. Furthermore, at the completion of the first half sinusoid, the current flow through four-layer diode 4 falls below the holding level and, therefore, the four-layer diode regains its fully nonconductive state. In some instances, where the load 2 is itself inductive inductor 8 can be eliminated.

Four-layer diode 6 is connected to form a similar output circuit for discharging capacitor 5 to provide a half sinusoid output pulse to load 3. Similarly, anode *6a* of four-layer diode 6 is connected to the positive plate of capacitor 5 via diode 10, the anode of diode 10 being connected to the capacitor. Cathode *6c* of the four-layer diode is connected to ground through the series combination of resistor 11, inductor 12, and load 3. Accordingly, when four-layer diode 6 is triggered into conductive state, capacitor 5 is discharged providing a half sinusoid pulse to load 3, the four-layer diode being restored to the nonconductive state at the completion of the half sinusoid pulse.

Magnetic core 5 associated with four-layer diode 4 has a generally annular ring-shaped configuration and is constructed from a suitable rectangular hysteresis loop material such as 50–50 nickel iron or sintered ferrite powder. Magnetic cores of this type have two different remnant states which persist after the core has been driven into saturation and, for convenience, are referred to as the set and reset states. When sufficient flux is induced in magnetic core 5 in a clockwise direction, i.e., the direction indicated by the arrow on the core of the drawing, the core becomes saturated and thereafter remains in the reset state. When flux is induced into the core in the opposite direction, i.e., counterclockwise, the core is driven toward the set state, and, if the flux is sufficient, the core becomes saturated and remains in the set state. This ability of the magnetic core to remain in a particular state indicative of the direction in which flux was last induced into the core makes such cores useful as memory devices. If magnetic flux is induced in the core, tending to drive the core in the direction already saturated, i.e., a clockwise flux applied to a reset core, there is very little change of flux in the core and therefore, no substantial potential can be induced in an output winding associated with the core. However, a magnetic core in the set state experiences a considerable change of flux under the same circumstances, and therefore a substantial output potential is generated in the output winding.

An input winding 15, a trigger winding 16, a reset winding 17 and a set winding 18 are spaced apart and wound about the annular core passing through the center thereof. As will be described hereinafter in greater detail, input winding 15 and reset winding 17, when energized, induce a clockwise flux into the core, tending to drive the core toward the reset state. Set winding 18, when energized, induces a counterclockwise flux into the magnetic core tending to drive the core toward the set state. Trigger winding 16 forms part of a trigger circuit which is responsive to potential generated in the trigger winding when the core changes from the set to the reset state, i.e., the generated potential having a polarity as indicated in the diagram.

Magnetic core 7 is similar to magnetic core 5, and has an input winding 20, a trigger winding 21, a reset winding 22, and a set winding 23 wound on the core in like fashion. Accordingly, input winding 20 and reset winding 22 tend to drive the core toward the reset state when energized, set winding 23 tends to drive the core toward the set state when energized, and trigger winding 21 provdes a potential of the polarity indicated on the diagram when the core changes from the set to the reset state.

Input windings 15 and 20 are connected in series with one another between input terminals *1a* and *1b*. When a positive pulse is applied to the input terminals, i.e., positive at terminal *1b* with respect to terminal *1a*, a clockwise flux is simultaneously induced in magnetic cores 5 and 7 tending to drive both cores in the reset direction. The input pulse is preferably of a magnitude insufficient to drive a magnetic core into saturation.

The trigger circuit for four-layer diode 4 includes trigger winding 16 connected in series with resistor 25 and diode 26, this trigger circuit being connected in parallel with diode 9 with the anode of diode 26 connected to the junction between the cathode of diode 9 and anode 4$a$ of the four-layer diode. The turns ratio between input winding 15 and trigger winding 16 is such that the input pulse applied to input terminals 1 can induce sufficient potential in trigger winding 16 by transformer action to trigger the four-layer diode into conduction. More specifically, as magnetic core 5 is driven toward the reset state, a positive potential is applied at the cathode of four-layer diode 4 which, in addition to the positive potential applied from the positive source of potential via resistance 13, is sufficient to trigger the four-layer diode into the conductive state. The four-layer diode can be triggered only when the core is being driven toward the reset state, since a change of flux in the opposite direction induces a potential in trigger winding 16 which back biases diode 26 and has no substantial effect upon the circuit. It should be noted that diode 9 provides a high impedance across which the trigger potential can be developed. Diode 9 also furnishes a low impedance for discharge current from capacitor 5 when the four-layer diode becomes conductive and limits current flow in the reverse direction while the four-layer diode recovers its non-conductive state.

The trigger circuit for four-layer diode 6 is in all respects similar to that for four-layer diode 4, and includes trigger winding 21 connected in series with resistor 27 and diode 28. The trigger circuit is connected in parallel with diode 10, with the cathode of diode 28 connected to the anode of four-layer diode 6. Accordingly, when an input pulse is applied to input terminal 1, and core 7 is in the set state, a potential is applied to the anode of four-layer diode 6 via trigger winding 21 which is sufficient to trigger the four-layer diode into the conductive state.

Reset winding 17, associated with magnetic core 5, and set winding 23, associated with magnetic core 7, are connected in series with one another and in series with diode 30 and resistor 31. This series combination is connected between cathode 4$c$ of four-layer diode 4 and ground and is therefore effectively in parallel with load 2. The output pulse developed when four-layer diode 4 becomes conductive is therefore applied to reset winding 17 and set winding 23 as well as load 2, these windings being wound on their respective cores such that current flow from the anode of the four-layer diode to ground induces a clockwise flux in magnetic core 5 and a counterclockwise flux in magnetic core 7. Accordingly, while four-layer diode 4 is conductive, magnetic core 5 is being driven into the reset state and magnetic core 7 is driven into the set state. Reset winding 22 and set winding 18 are similarly connected in series with one another and in series with diode 32 and resistor 33. This series combination is connected between the cathode of four-layer diode 6 and ground and therefore effectively in parallel with load 3. In like fashion, when four-layer diode 6 is rendered conductive, current flows through reset winding 22 and set winding 18, thereby driving core 7 into the reset state and core 5 into the set state.

Diodes 30 and 32 are poled in a direction permitting current to flow from the cathodes of the respective four-layer diodes to ground. The purpose of these diodes is to block the potential generated in reset windings 17 and 22 by transformer action in response to the input pulse applied to respective input windings 15 and 20. If this potential were not blocked, it would be applied to the cathodes of the four-layer diodes and have a tendency to cancel the effect of the potential applied simultaneously to the anodes of the four-layer diodes via the trigger windings.

Resistors 31 and 33 are current limiting resistors and prevent a too rapid dissipation of energy from capacitor 5 through the reset and set windings. The resistance values are so selected with regard to the total impedance of the parallel path through one of the loads that the minimum energy sufficient to saturate the magnetic cores flows through the set and reset windings leaving the remaining energy for the load.

Assuming that magnetic core 5 is initially in the set state and magnetic core 7 is initially in the reset state, the operation of the two-stage pulse distributor can be described as follows. The first positive pulse applied to input terminals 1 has no substantial effect upon magnetic core 7 since this core is in the reset state, but since magnetic core 5 is in the set state, this core is driven toward the reset state. This change of flux in magnetic core 5 generates a potential in trigger winding 16 which is applied to the anode of four-layer diode 4 and triggers this diode into the conductive state. Capacitor 5, which has previously become fully charged, then discharges through conductive four-layer diode 4 providing an output pulse to load 2. Also, when capacitor 5 discharges through four-layer diode 4, current flows through reset winding 17, driving magnetic core 5 into the fully reset state, and flows through set winding 23, driving magnetic core 7 into the fully set state. Thus, the effect of the first pulse applied is to provide an output pulse to load 2, to reset core 5 and to set core 7 for response to the next incoming pulse.

The second applied incoming pulse has no substantial effect on magnetic core 5, but does cause a change of flux in magnetic core 7 which generates a potential for triggering four-layer diode 6 into the conductive state. When this four-layer diode is conductive, capacitor 5 is discharged providing an output pulse to load 3. Also, the capacitor discharge current flows through reset winding 22 and set winding 18 thereby placing core 7 in the reset state and core 5 in the set state. Accordingly, magnetic core 5 is now conditioned for response to the next incoming pulse, and therefore the following input pulse causes load 2 to be energized, and the pulse after that causes load 3 to again become energized. The loads 2 and 3 are therefore energized alternately in response to consecutive incoming pulses applied at input terminals 1.

It is important that the time duration of the input pulse be less than the discharge time of capacitor 5. Again, assuming the core 5 is in the set state and core 7 is in the reset state, it should be noted that the incoming pulse need only be of sufficient time duration to induce a triggering potential in trigger winding 16. Thereafter, four-layer diode 4 is rendered conductive and completes the task of driving core 15 into the reset state. When four-layer diode 4 is conductive, it also provides current flow through set winding 23 which induces flux in magnetic core 7 in a direction opposite to that induced in the core by input winding 20. Therefore, the input pulse should be terminated before the capacitor discharge is completed in order to minimize the opposition.

FIG. 2 is a second embodiment of this invention wherein controlled rectifiers are employed in place of four-layer diodes.

The negative plate of a capacitor 40 is connected to ground and the positive plate thereof is connected to a positive source of potential through a resistor 41. Controlled rectifiers 42 and 43 are connected in parallel with capacitor 40 to discharge the capacitor and selectively energize loads 44 and 45 respectively. More specifically, the anodes 42$a$ and 43$a$ of the controlled rectifiers are each connected to the junction between resistor 41 and capacitor 40. Cathode 42$c$ of controlled rectifier 42 is connected to ground via the series combination of resistor 46, inductor 47 and load 44. Similarly, cathode 43$c$ of controlled rectifier 43 is connected to ground via the series combination of resistor 48, inductor 49 and load 45.

Capacitor 40 is charged from the positive source of potential through resistor 41. The capacitor can be discharged when controlled rectifier 42 is triggered into the conductive state by applying a positive trigger potential to the gate element 42$g$. Accordingly, when controlled rectifier 42 is conductive, current flows through this controlled rectifier, resistor 46, inductor 47 and load 44. Inductor 47 forms a series resonant circuit with capacitor 40, making the pulse applied to load 44 in the shape of a half sinusoid. The tendency for current flow to reverse direction through controlled rectifier 42 commutates the controlled rectifier bringing about the nonconductive state. In like fashion, controlled rectifier 43 can be rendered conductive by a positive trigger pulse on the gate element 43*g* to provide a half sinusoid pulse to load 45.

Annular magnetic cores 50 and 51 are similar to magnetic cores 5 and 7 described in FIG. 1, and have wound thereon respectively input windings 52 and 53, trigger windings 54 and 55, reset windings 56 and 57, and set windings 58 and 59.

Input windings 52 and 53 are connected in series with one another between input terminals 60*a* and 60*b*. When a positive pulse is applied to the input terminals, i.e., positive at terminal 60*b* with respect to terminal 60*a*, current flows through the input windings tending to induce a clockwise flux in the respective cores. The duration of the input pulses is limited to be less than the time required for the capacitor 40 to discharge.

One end of trigger winding 54 is connected to gate 42*g* of controlled rectifier 42 via diode 61, the anode of diode 61 being connected to the gate element. The other end of trigger winding 54 is connected to cathode 42*c* of the controlled rectifier, and a resistor 62 is connected between gate element 42*g* and cathode 42*c*. Trigger winding 54 is so wound on core 50 that, whenever there is a change of flux driving the core from the set state toward the reset state, a potential is induced in trigger winding 54 making gate element 42*g* positive with respect to cathode 42*c* thereby triggering controlled rectifier 42 into the conductive state. A potential of the opposite polarity is induced in trigger winding 54 when core 50 goes from the reset to the set state, but this potential has no effect since diode 61 becomes back biased. One end of trigger winding 55 is connected to gate element 43*g* via diode 63, the other end of the winding being connected to cathode 43*c*. Resistor 64 is connected between cathode 43*c* and gate element 43*g*. Accordingly, when magnetic core 51 changes from the set to the reset state, a potential is applied to gate element 43*g* which is positive with respect to cathode 43*c* and controlled rectifier 43 is triggered into the conductive state.

Reset winding 57, which is wound on magnetic core 51, and set winding 58, which is wound on magnetic core 50, are connected in series with one another and in series with a diode 66 and resistor 67. This series combination is connected between cathode 43*c* and ground and is therefore effectively in parallel with load 45. Accordingly, when controlled rectifier 43 is rendered conductive and provides a pulse to load 45, the same pulse is also applied through diode 66 to energize reset winding 57 and set winding 58. As a result, magnetic core 51 is driven into the reset state and magnetic core 50 is driven into the set state. Resistors 67 and 48 have values so selected that the discharge current from capacitor 40 is distributed between their respective paths so as to provide the minimum energy required to saturate both cores. Diode 66 is poled in a direction to prevent the potential generated in reset winding 57 from opposing the trigger potential applied to gate element 43*g*.

Reset winding 56 associated with magnetic core 50, and set winding 59 associated with magnetic core 51, are similarly connected in series with one another and in series with a diode 68 and a resistor 69. The series combination is connected between cathode 42*c* of controlled rectifier 42 and ground, effectively in parallel with load 44. Accordingly, when controlled rectifier 42 is rendered conductive to provide pulse energization to load 44, reset winding 56 and set winding 59 are energized, thereby driving magnetic core 50 into the reset state and magnetic core 51 into the set state.

The operation of the circuit shown in FIG. 2 is essentially the same as that previously described in FIG. 1. Magnetic core 50 is initially assumed to be in the set state and magnetic core 51 in the reset state. The first applied input pulse has no substantial effect on magnetic core 51, but tends to drive magnetic core 50 in the reset direction thereby inducing a trigger potential in trigger winding 54. The potential induced in trigger winding 54 is applied to gate element 42*g* and renders controlled rectifier 42 conductive. When conductive, the controlled rectifier discharges capacitor 40 and provides an output pulse in the shape of a half sinusoid to load 44. The discharge of capacitor 40 also energizes reset winding 56 driving magnetic core 50 into the fully reset state and energizes set winding 59 driving core 51 into the fully set state. Thus, the first pulse applied provides pulse energization only to load 44 and conditions magnetic core 51 for response to the next applied input pulse.

The next applied input pulse therefore tends to drive magnetic core 51 in the reset direction and therefore induces a potential via trigger winding 55 which renders controlled rectifier 43 conductive. The conductive controlled rectifier discharges capacitor 40 providing an output pulse to load 45 and resets magnetic core 51 and sets magnetic core 50. Accordingly, the second applied pulse causes pulse energization of load 45 and conditions magnetic core 50 for response to the next applied input pulse. The circuit continues operation in this manner, energizing loads 44 and 45 alternately in accordance with successive pulses applied to input terminals 60.

While the illustrative embodiments shown in FIGS. 1 and 2 are pulse distributors of the binary type, it is obvious that pulse distributors having more stages could easily be constructed within the teachings of this invention. With such pulse distributors, a separate pulse generating circuit is required for each separate output line, each of these pulse generating circuits including a regenerative semiconductor in combination with a magnetic core to discharge a common capacitor (or separate capacitors if desired). One of the cores would initially be placed in the set state and be thus conditioned for response to the first applied input pulse. The first input pulse would then energize the load associated with the conditioned pulse generator circuit and then, through the interconnections between pulse generator circuits, would condition another core for response to the second pulse. Operation would continue in this manner with the last pulse generator circuit benig interconnected to condition the first pulse generator circuit, thereby creating a continuous cyclic operation.

While the embodiments shown and the descriptions relate specifically to pulse distributors, this invention is not so limited since the pulse generator circuit described has utility in other type installations. The scope of the present invention is pointed out more particularly in the appended claims.

What is claimed is:

1. A pulse generator comprising a regenerative semiconductor device having a normally nonconductive state and a stable conductive state which due to internal regeneration persists subsequent to removal of a trigger potential causing the device to be put into that conductive state, circuit means connected to said semiconductive device operative to trigger that device into the conductive state for a predetermined time period, a saturable magnetic core having a set and a reset state, said circuit means including a reset winding operatively associated with said core to drive it into said reset state when said semiconductor device is in the conductive state, means operatively associated with said core to selectively drive it into the set state, a capacitor connected to said semiconductor device,
means connected for charging said capacitor, and
an output winding operatively associated with said core and connected to provide an output potential for triggering said semiconductor device into said conductive state whenever said core is being driven toward said reset state to thereby cause said capacitor to discharge through said semiconductor device and said reset winding to drive said core into the fully reset state.

2. In a pulse generator the combination of
a regenerative semiconductor device having a normally nonconductive state and a stable conductive state, said conductive state due to internal regeneration persisting subsequent to removal of a trigger potential causing the device to be put into that conductive state,
a saturable magnetic core having two remnant states,
circuit means operatively associated with said core and connected to provide a trigger potential to said semiconductor device when said core tends to change remnant state,
a winding operatively associated with said core, and a source of potential so connected that current flows through said winding to drive said core into one of said remnant states when said semi-conductor device is conductive.

3. A pulse generator in accordance with claim 2 wherein said regenerative semiconductor is a PNPN four-layer diode.

4. A pulse generator in accordance with claim 2 wherein said regenerative semiconductor is a controlled rectifier.

5. A pulse generator for selectively energizing a load in response to input pulses comprising
a capacitor,
means for charging said capacitor,
a discharge circuit for said capacitor comprising
a load device and
a regenerative semiconductor operatively connected to discharge said capacitor through said load device when that semiconductor is conductive,
a magnetic memory core having a set and a reset state,
set circuit means operatively associated with said core to selectively drive said core into the set state,
trigger circuit means operatively associated with said core and connected to trigger said semiconductor into conduction in response to an applied input pulse when said core is in the set state, and
reset circuit means operatively associated with said core and connected to drive said core into the reset state when said regenerative semiconductor is conductive.

6. A pulse generator in accordance with claim 5 wherein said regenerative semiconductor is a PNPN four-layer diode.

7. A pulse generator in accordance with claim 5 wherein said regenerative semiconductor is a controlled rectifier.

8. In a pulse generator for energizing two separate load devices alternately, the combination of
first and second magnetic cores each having a set and reset state,
first and second regenerative semiconductor devices associated, respectively, with said first and second cores,
trigger circuit means operatively coupled with each core and connected to render the associated semiconductor device conductive whenever the core is driven toward the reset state,
first and second circuit means including, respectively, said first and second semiconductor devices and each operatively associated with both of said cores to drive the associated core to the fully reset state, and to drive the other of said cores into the set state, when the included semiconductor device is conductive, and
input circuit means operatively associated with both of said cores to create in both of said cores simultaneously magnetic flux tending to drive a set core toward the reset state.

9. A pulse generator in accordance with claim 8 wherein said regenerative semiconductors are PNPN four-layer diodes.

10. A pulse generator in accordance with claim 9 wherein said regenerative semiconductors are controlled rectifiers.

11. A pulse distributor for energizing a plurality of load devices sequentially in accordance with successive input pulses comprising
a capacitor with means for charging same;
a plurality of regenerative semiconductors each connected to discharge said capacitor through a different load device when conductive;
a plurality of magnetic memory devices each having a set and reset state and each associated with a different one of said semiconductors;
trigger circuit means operatively coupled to each of said cores and connected to trigger the associated one of said regenerative semiconductors into conduction in response to an input pulse if the core coupled thereto is in the set state; and
a plurality of set-reset circuit means each connected to a different regenerative semiconductor and operatively coupled to drive the associated one of said cores into the reset state and to drive another one of said cores into the set state when the connected one of said regenerative semiconductors is conductive.

12. A pulse distributor in accordance with claim 11 wherein said regenerative semiconductor is a PNPN four-layer diode.

13. A pulse distributor in accordance with claim 11 wherein said regenerative semiconductor is a controlled rectifier.

14. A pulse generator for selectively energizing a load device in response to input pulses comprising
monostable circuit means connected to a source of potential and the load device to provide current flow through said load device for a predetermined period of time in response to a trigger potential,
a magnetic memory core having a set and a reset state,
circuit means operatively associated with said core to selectively drive said core into the set state,
trigger circuit means operatively associated with said core and connected to provide trigger potential to said monostable circuit means when said core tends to change state toward the reset state, and
reset circuit means operatively associated with said core and included within said monostable circuit means to drive said core into the reset state as current flow is being provided to the load device.

15. A pulse generator in accordance with claim 14 wherein said monostable circuit means comprises
a capacitor, means for charging said capacitor
and a regenerative semiconductor connected to discharge said capacitor through the load device in response to a trigger potential applied thereto.

16. In a pulse generator, the combination of
an internally regenerative semiconductor device which is normally nonconductive but is adapted to become conductive by the application of a trigger potential thereto and to be maintained conductive by internal regeneration even though the trigger potential is removed therefrom,
a magnetic memory core having a reset and a set state,
circuit means operatively associated with said core for driving said core into the set state,
trigger circuit means operatively associated with said core and connected to provide a trigger potential to said regenerative device when said core tends to change state toward the reset state, and reset circuit means operatively associated with said core and connected to said regenerative device to drive said core into the reset state when said regenerative device is in the conductive state.

References Cited by the Examiner

UNITED STATES PATENTS 2,911,626 11/59 Jones et al. ---------- 307—88.5 X

OTHER REFERENCES

SCR Manual (2nd Edition), GE Co., Dec. 29, 1961, pages 149, 150.

Olsen: "Solid State Binary Trigger," IBM Technical Disclosure Bulletin, vol. 2, No. 5, February 1960.

Schaaf: IBM Technical Disclosure Bulletin, vol. 4, No. 8, January 1962, page 147.

JOHN W. HUCKERT, *Primary Examiner.*

ARTHUR GAUSS, *Examiner.*